(12) United States Patent
Reshetnyak et al.

(10) Patent No.: US 10,481,433 B1
(45) Date of Patent: Nov. 19, 2019

(54) DYNAMIC OPTICAL AND RF DEVICES BASED ON STRUCTURED PLASMONICS AND LIQUID CRYSTAL HYBRIDS

(71) Applicant: Government of the United States as Represented by the Secretary of the Air Force, Washington, DC (US)

(72) Inventors: Victor Yu Reshetnyak, Kiev (UA); Dean R. Evans, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 16/117,488

(22) Filed: Aug. 30, 2018

(51) Int. Cl.
  *G02F 1/1335* (2006.01)
  *G02F 1/01* (2006.01)
  *G02B 5/00* (2006.01)
  *G02F 1/00* (2006.01)

(52) U.S. Cl.
  CPC ......... *G02F 1/13362* (2013.01); *G02B 5/003* (2013.01); *G02F 1/0063* (2013.01); *G02F 1/0136* (2013.01); *G02F 1/133509* (2013.01)

(58) Field of Classification Search
  CPC ...... G02B 5/003; G02B 5/008; G02B 6/1226; G02F 1/0136; G02F 1/0063; G02F 1/133509; G02F 1/13362; G02F 2203/10; H01L 31/02322
  See application file for complete search history.

(56) References Cited

U.S. PATENT DOCUMENTS

| | | | |
|---|---|---|---|
| 6,785,320 B1 * | 8/2004 | Amos | H01S 5/18355 257/21 |
| 7,889,413 B1 | 2/2011 | Cook et al. | |
| 8,658,056 B1 | 2/2014 | Cook et al. | |
| 9,061,905 B2 | 6/2015 | Cook et al. | |
| 9,188,820 B1 | 11/2015 | Evans et al. | |
| 2011/0109821 A1 * | 5/2011 | Tang | G02F 1/23 349/32 |
| 2011/0109956 A1 * | 5/2011 | Hashimura | G02F 1/19 359/290 |
| 2013/0270596 A1 * | 10/2013 | Senellart | B82Y 20/00 257/98 |
| 2016/0218434 A1 * | 7/2016 | Akyildiz | H01Q 1/38 |
| 2016/0223843 A1 * | 8/2016 | Park | B82Y 20/00 |
| 2016/0227639 A1 * | 8/2016 | Kaminer | H05G 2/00 |
| 2017/0322457 A1 * | 11/2017 | Chanda | B82Y 20/00 |

(Continued)

OTHER PUBLICATIONS

Jennifer L. Carns et al.: "Self-activated liquid-crystal cells with photovoltaic substrates", Optics Letters, vol. 31, No. 7, pp. 993-995, Apr. 1, 2006.

(Continued)

*Primary Examiner* — Paisley L Wilson
*Assistant Examiner* — Mariam Qureshi
(74) *Attorney, Agent, or Firm* — AFMCLO/JAZ; Timothy Barlow

(57) ABSTRACT

An optical/RF apparatus comprising a liquid crystal (LC) layer placed above or below a plasmon layer (e.g., a periodic array of graphene ribbons) to enable the tuning of the surface plasmons by varying the voltage applied to the LC to realize thereby devices such as tunable mid-IR, far-IR or THz modulators and filters.

17 Claims, 7 Drawing Sheets

(56) References Cited

U.S. PATENT DOCUMENTS

2019/0072824 A1* 3/2019 Hwang ............. G02F 1/134309
2019/0115164 A1* 4/2019 Tang ..................... H01G 11/36

OTHER PUBLICATIONS

Shawn J. Tan et al.: "Building plasmonic nanostructures with DNA", Nature Nanotechnology, vol. 6, pp. 268-276, May 2011.
M. Ravi Shankar et al.: "Contactless, photoinitiated snap-through in azobenzene-functionalized polymers", PNAS, vol. 110, No. 47, pp. 18792-18797, Nov. 19, 2013.
Luciano De Sio et al.: "POLICRYPS-based electrically switchable Bragg reflector", Optics Express, vol. 23, No. 25, Dec. 2015.
Chao Yuan et al.: "3D printed reversible shape changing soft actuators assisted by liquid crystal elastomers", The Royal Society of Chemistry, Soft Matters, vol. 13, pp. 5558-5568, 2017.

* cited by examiner

DYNAMIC OPTICAL AND RF DEVICES BASED ON STRUCTURED PLASMONICS AND LIQUID CRYSTAL HYBRIDS

GOVERNMENT INTEREST

The invention described herein may be manufactured and used by or for the Government of the United States for all governmental purposes without the payment of any royalty.

CROSS-REFERENCE TO RELATED APPLICATION

This application claims the benefit of and priority to prior filed Provisional Application Ser. No. 62/551,984, filed Aug. 30, 2017, entitled DYNAMIC OPTICAL AND RF DEVICES BASED ON STRUCTURED PLASMONICS AND LIQUID CRYSTAL HYBRIDS, which provisional patent application is incorporated herein by reference in its entirety.

FIELD OF THE DISCLOSURE

The present invention relates generally to optical filters and optical switches and, more particularly, to plasmonic absorption and/or reflection in plasmonic ribbons, monolayers and the like as dynamic optical filters and optical switches.

BACKGROUND

Surface plasmons in graphene possess stronger mode confinement and lower propagation loss. One way to excite the surface plasmons is placing a periodic array of graphene nanoribbons (or monolayer plasmonic material) on top of a dielectric substrate. However, once the system is fabricated it is not possible to change its optical properties. What is desired is a system that permits adjustments or alteration of such optical properties.

SUMMARY OF THE INVENTION

Various deficiencies in the prior art are addressed below by the disclosed systems, methods, architectures, mechanisms, and/or apparatus configured to provide a liquid crystal (LC) layer placed above or below a plasmon layer (e.g., a periodic array of graphene ribbons) to enable the tuning of the surface plasmons by varying the voltage applied to the LC to realize thereby devices such as tunable mid-IR, far-IR or THz modulators and filters.

Various embodiments comprise a dielectric substrate having disposed thereon a plasmonic material layer comprising graphene ribbons or monolayer plasmonic material and having a geometry (e.g., ribbon width/spacing, anisometric shapes etc.) configured to support surface plasmon polariton (SPP) excitation in response to an incident RF/light beam, wherein at least a portion of this layer has disposed upon it a liquid crystal (LC) layer configured to change, in response to an electric field applied thereto, the polarization/availability of the incident RF/light beam and/or permittivity of the surrounding material to modify thereby the SPP excitation and, therefore, the response of the RF/optical apparatus. In particular, the electric field causes the LC layer to tune the surface plasmons in an array of graphene ribbons (or monolayer plasmonic material) by, illustratively, shifting the graphene ribbons' plasmonic "notch" and changing its "depth."

An apparatus according to one embodiment comprises: a substrate having permittivity and absorption characteristics supporting plasmon excitation within a spectral region of interest; a plasmonic layer disposed upon the substrate and including plasmonic material configured to exhibit surface plasmon polaritons (SPP) when exposed to an incident light beam of a first polarization; and a liquid crystal (LC) layer disposed upon at least a portion of the plasmonic layer and configured to change a polarization of a light beam passing therethrough; the LC layer, in response to a first electric field applied thereto, changes the polarization of the light beam passing therethrough to the first polarization; the LC layer, in response to a second electric field applied thereto, changes the polarization of the light beam passing therethrough to a second polarization, the second polarization being substantially orthogonal to the first polarization.

According to a first variation of the embodiment described above, said plasmonic material is configured to not exhibit SPP when exposed to an incident light beam of said second polarization.

According to a further variation of the embodiment described above, the plasmonic material comprises at least one layer of graphene ribbons having a geometry and spacing selected to provide sensitivity to the spectral region of interest.

According to another variation of the embodiment described above, said first polarization is perpendicular to a long axis of said graphene ribbons.

According to a further variation of the embodiment described above, the plasmonic material is formed within said plasmonic layer as one or more of a ribbon form, a monolayer form, a particle/colloid form and a nanoparticle/nanocolloid form.

According to another variation of the embodiment described above, each monolayer of plasmonic material comprises at least one of graphene, gold, silver, copper, $VO_2$, and $V_xO_y$.

According to a further variation of the embodiment described above, said plasmonic material further comprises anisometric shaped plasmonic material; and said LC layer, in response to each of at least one additional electric field applied thereto, changes said polarization of said light beam passing therethrough to, respectively, at least one additional polarization.

According to another variation of the embodiment described above, said apparatus further comprises a controllable electric potential source configured to impart each of a plurality of electric fields to said LC layer to provide thereby a tuning function of said apparatus.

According to a further variation of the embodiment described above, the substrate comprises at least one of silicon, $SiO_2$, $Al_2O_3$, $VO_2$, $V_xO_y$, CdTe, and ITO.

According to another variation of the embodiment described above, the liquid crystal layer is at least one of cholesteric liquid crystals (CLC), nematic liquid crystals), twisted nematic liquid crystals, smectic liquid crystal, and swinging nematic liquid crystals (SLC).

According to a further variation of the embodiment described above, said incident light comprises one of an optical wavelength light and a millimeter wavelength light.

According to another variation of the embodiment described above, said plasmonic layer comprises a deformable plasmonic layer, said apparatus further comprising an elastomer layer disposed between the substrate and the deformable plasmonic layer and configured to expand or contract in response to an applied stimuli, said elastomer layer mechanically cooperating with said deformable plasmonic layer such that a distance between said graphene ribbons changes in response to expanding or contracting of said elastomer layer.

According to a further variation of the embodiment described above, said plasmonic layer comprises a deformable plasmonic layer, said apparatus further comprising: an elastomer layer disposed between the substrate and the deformable plasmonic layer and configured to expand or contract in response to an applied stimuli, said elastomer layer mechanically cooperating with said deformable plasmonic layer to change a geometry of plasmonic material formed therein. The geometry is associated with SPP excitation.

According to another variation of the embodiment described above, said plasmonic layer comprises a deformable plasmonic layer; and said LC layer comprises an LC elastomer layer mechanically cooperating with said deformable LC layer and configured to expand or contract in response to an applied stimuli to thereby change a geometry of plasmonic material within said plasmonic layer.

According to a further variation of the embodiment described above, the plasmonic layer comprises a stack of plasmonic material ribbon layers separated by at least one of tunable dielectric layers, metallic layers and phase change layers.

According to another variation of the embodiment described above, the plasmonic material comprises a metallic layer having disposed thereon a distributed Bragg mirror configured to excite Tamm plasmons therebetween when exposed to an incident light beam.

According to a further variation of the embodiment described above, the distributed Bragg mirror comprises a stack of dielectric layers wherein the thicknesses of each layer multiplied by the refractive index of the respective layer is equal to one fourth of the wavelength of the incident light beam.

According to another variation of the embodiment described above, the distributed Bragg mirror further comprises a metallic layer disposed within the stack of dielectric layers.

According to a further variation of the embodiment described above, said incident light beam comprises a light beam of normal incidence with respect to the LC layer.

According to another variation of the embodiment described above, said plasmonic layer is formed within said LC layer.

According to a further variation of the embodiment described above, said substrate comprises a photo-generating material configured to generate one of said first and second electric fields.

According to another variation of the embodiment described above, said spacing between said ribbons comprises at least one of $VO_2$ and $MoS_2$.

According to a further variation of the embodiment described above, said plasmonic layer comprises a metallic layer having disposed thereon a distributed Bragg mirror configured to excite Tamm plasmons therebetween when exposed to an incident light beam.

According to another embodiment of the invention, a method of making a dynamic optical and RF device comprises: disposing, upon a substrate having permittivity and absorption characteristics supporting plasmon excitation within spectral region of interest, a plasmonic layer including plasmonic material configured to exhibit surface plasmon polaritons (SPP) when exposed to an incident light beam of a first polarization; and disposing, upon at least a portion of the plasmonic layer, a liquid crystal (LC) layer configured to change a polarization of a light beam passing therethrough; the LC layer, in response to a first electric field applied thereto, changes the polarization of the light beam passing therethrough to the first polarization; the LC layer, in response to a second electric field applied thereto, changes the polarization of the light beam passing therethrough to a second polarization, the second polarization being substantially orthogonal to the first polarization.

According to another embodiment of the invention, a dynamic optical and RF device comprises a substrate having permittivity and absorption characteristics supporting plasmon excitation within a spectral region of interest; and a liquid crystal (LC) layer, disposed upon at least a portion of the substrate and configured to change a polarization of a light beam passing therethrough; the LC layer comprising plasmonic material configured to exhibit surface plasmon polaritons (SPP) when exposed to an incident light beam of a first polarization; said LC layer, in response to a first electric field applied thereto, changes said polarization of said light beam passing therethrough to said first polarization; said LC layer, in response to a second electric field applied thereto, changes said polarization of said light beam passing therethrough to a second polarization, said second polarization being substantially orthogonal to said first polarization.

According to a first variation of the embodiment, said plasmonic material is configured to not exhibit SPP when exposed to an incident light beam of said second polarization.

According to a further variation of the embodiment, the plasmonic material comprises at least one layer of graphene ribbons having a geometry and spacing selected to provide sensitivity to the spectral region of interest.

According to another variation of the embodiment, said first polarization is perpendicular to a long axis of said graphene ribbons.

According to a further variation of the embodiment, the plasmonic material is formed within said LC layer as one or more of a ribbon form, a monolayer form, a particle/colloid form and a nanoparticle/nanocolloid form.

According to another variation of the embodiment, each monolayer of plasmonic material comprises at least one of graphene, gold, silver, copper, $VO_2$, and $V_xO_y$.

According to a further variation of the embodiment, said plasmonic material further comprises anisometric shaped plasmonic material; and said LC layer, in response to each of at least one additional electric field applied thereto, changes said polarization of said light beam passing therethrough to, respectively, at least one additional polarization.

According to another variation of the embodiment, said apparatus further comprises a controllable electric potential source configured to impart each of a plurality of electric fields to said LC layer to provide thereby a tuning function of said apparatus.

According to a further variation of the embodiment, the substrate comprises at least one of silicon, $SiO_2$, $Al_2O_3$, $VO_2$, $V_xO_y$, CdTe, and ITO.

According to another variation of the embodiment, the liquid crystal layer comprises at least one of cholesteric liquid crystals (CLC), nematic liquid crystals), twisted nematic liquid crystals, smectic liquid crystal, and swinging nematic liquid crystals (SLC).

According to a further variation of the embodiment, said incident light comprises one of an optical wavelength light and a millimeter wavelength light.

According to another variation of the embodiment, said LC layer comprises a deformable layer configured to expand or contract in response to an applied stimuli such that a distance between said graphene ribbons changes in response to said expanding or contracting.

According to a further variation of the embodiment, said LC layer comprises an elastomeric layer configured to expand or contract in response to an applied stimuli to change a geometry of plasmonic material formed therein.

According to another variation of the embodiment, said plasmonic layer comprises a deformable plasmonic layer and said LC layer comprises an elastomeric LC elastomer layer mechanically cooperating with said deformable plasmonic layer and configured to expand or contract in response to an applied stimuli to thereby change a geometry of plasmonic material within said deformable plasmonic layer.

According to a further variation of the embodiment, the plasmonic material comprises a stack of plasmonic material ribbon layers separated by at least one of tunable dielectric layers, metallic layers, and phase change layers.

According to another variation of the embodiment, the plasmonic material comprises a metallic layer having disposed thereon a distributed Bragg mirror configured to excite Tamm plasmons therebetween when exposed to an incident light beam.

According to a further variation of the embodiment, the distributed Bragg mirror comprises a stack of dielectric layers wherein the thicknesses of each layer multiplied by the refractive index of the respective layer is equal to one fourth of the wavelength of the incident light beam.

According to another variation of the embodiment, the distributed Bragg mirror further comprises a metallic layer disposed within the stack of dielectric layers.

According to a further variation of the embodiment, said incident light beam comprises a light beam of normal incidence with respect to the LC layer.

According to another variation of the embodiment, said substrate comprises a photo-generating material configured to generate one of said first and second electric fields.

According to a further variation of the embodiment, said spacing between said ribbons comprises at least one of $VO_2$ and $MoS_2$.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
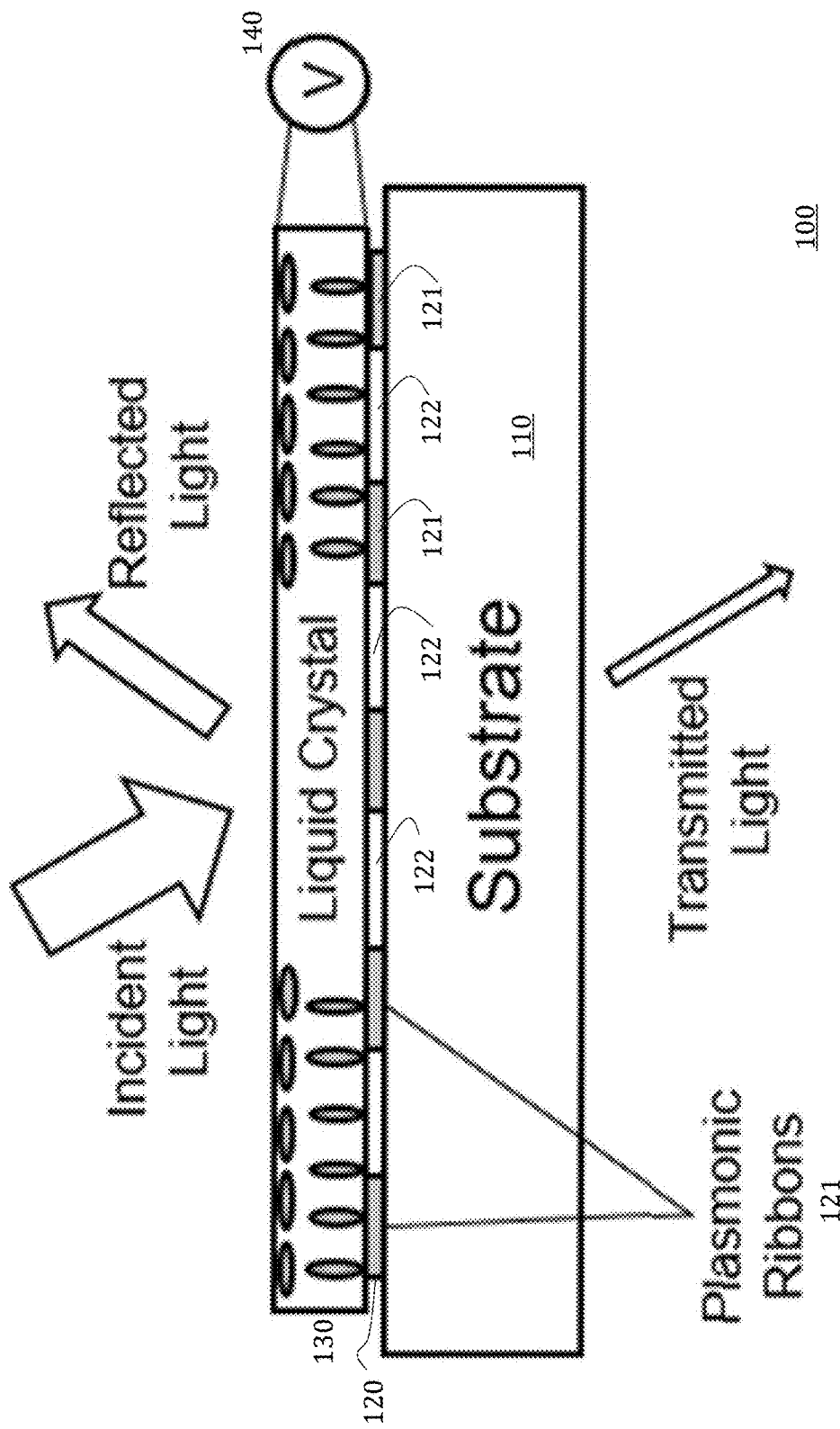
FIG. 1 depicts a dynamic optical and RF device according to an embodiment of the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Part of the invention lies in the recognition by the inventors that a surface electromagnetic wave propagating in a conducting layer (e.g., graphene ribbons or monolayer) sandwiched between two isotropic dielectrics results in a dispersion relation for surface plasmon-polaritons (SPP), and that by changing the grating period, the Fermi energy level, and/or the dielectric constant of layers placed above or below the graphene, the frequency of the surface plasmons may be controlled. Other control mechanisms may also be employed within the context of the various embodiments.

In the various embodiments, the two isotropic dielectrics comprise a liquid crystal (LC) layer and a dielectric substrate having disposed therebetween a plasmon material layer formed in accordance with one or more geometries. Reorienting the liquid crystal director (i.e., changing the LC dielectric tensor components) enables the tuning of a SPP surface wave. In the case of exciting plasmons in graphene using a periodic array of graphene ribbons, the motion of the free carriers is restricted, which supports resonant oscillation modes as the bound electrons. Plasmon excitations in the graphene ribbon array are due to the collective oscillations of electrons across the width of the ribbons (the exciting wave polarization being perpendicular to the ribbons). These plasmons can be controlled by changing the array period, the ribbon width (w) and graphene electrostatic gating. It is noted that plasmon frequency scales with ribbon width as $w^{-1/2}$ and carrier concentration (n) as $n^{1/4}$.

Thus, the various embodiments utilize a LC layer as a dynamic dielectric material to tune the surface plasmons in various geometries, patterns, and arrangements. In particular, the various embodiments comprise systems, methods, architectures, mechanisms, and/or apparatuses configured to provide a dielectric substrate having disposed thereon a plasmonic material layer comprising graphene ribbons or monolayer plasmonic material and having a geometry (e.g., ribbon width/spacing, anisometric shapes etc.) configured to support SPP excitation in response to an incident RF/light beam, wherein at least a portion of this layer has disposed upon it a liquid crystal (LC) layer configured to change, in response to an electric field applied thereto, the polarization/availability of the incident RF/light beam and/or permittivity of the surrounding material to modify thereby the SPP excitation and, therefore, the response of the RF/optical apparatus. Liquid crystals (LC) are a uniaxial medium with an optical axis easily controlled by external stimuli. LCs may be used to tune the surface plasmons in an array of graphene ribbons (or monolayer plasmonic material) by disposing an LC slab upon a plasmonic layer including plasmonic material such as graphene ribbons, wherein a voltage applied to the LC layer shifts the graphene ribbons' plasmonic notch and changes its depth.

In particular, placing a LC layer above or below a plasmon layer (e.g., a periodic array of graphene ribbons) allows tuning of the surface plasmons by varying the voltage applied to the LC layer to realize thereby devices such as tunable mid-IR, far-IR or THz modulators and filters.

Disclosed embodiments include an RF/optical apparatus (e.g., a dynamic RF/optical filter or switch) that can be switched off, on and/or spectrally tuned. Specifically, tunability of a (normally fixed response) RF/optical device using surface plasmon polaritons (SPP) excitation is provided via an electrically controlled liquid crystal layer operative to wholly or partially block an RF/optical excitation beam, modify the polarity of the beam and so on.

FIG. 1 depicts a dynamic optical and RF device 100 according to an embodiment of the invention. In particular, FIG. 1 depicts an optical/RF device comprising a dielectric substrate 110 having disposed thereon a plasmonic layer 120 comprising a plurality of plasmonic ribbons 121 disposed in parallel and separated by gaps or spacings 122. A liquid crystal (LC) layer 130 is disposed upon at least a portion of the plasmonic layer 120 and configured to process an incident RF/optical beam directed toward the plasmonic layer 120 via the LC layer 130 by, illustratively, controllably blocking some or all of the beam from passing to the plasmonic layer 120 (i.e. reflecting some or all of the beam), passing some or all of the beam to the plasmonic layer 120, changing the polarization of beam passed to the plasmonic layer 120 and/or otherwise processing the incident RF/optical beam.

It is noted that while the plasmonic layer 120 depicted in FIG. 1 is shown as comprising a specific number of plasmonic material ribbons 121 with corresponding spacings 122 there between, it will be appreciated that more or fewer plasmonic material ribbons may be used, and that the thickness/spacing associated with either of the plasmonic material ribbons 121 and corresponding spacings 122 may be different than depicted in FIG. 1.

Figure 2:
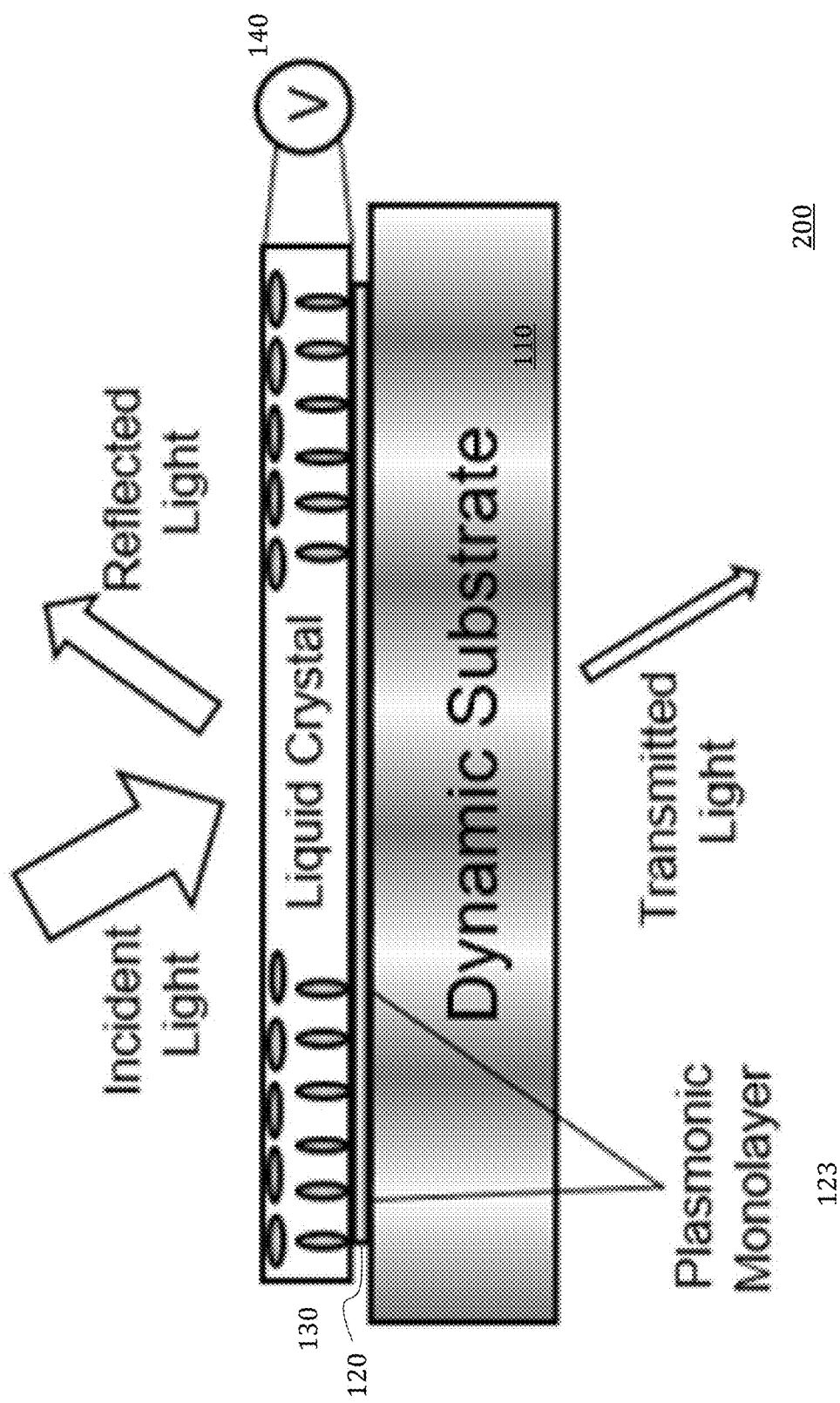
FIG. 2 depicts a dynamic optical and RF device having a plasmonic monolayer and a dynamic substrate, according to an embodiment of the invention.

FIG. 2 depicts a dynamic optical and RF device according to another embodiment of the invention. In particular, FIG. 2 depicts an optical/RF device 200 comprising a dielectric substrate 110 having disposed thereon a plasmonic layer 120 comprising a plasmonic monolayer 123. A liquid crystal (LC) layer 130 is disposed upon at least a portion of the plasmonic layer 120 and configured to process an incident RF/optical beam directed toward the plasmonic layer 120 via the LC layer 130 by, illustratively, controllably blocking some or all of the beam from passing to the plasmonic layer 120 (i.e. reflecting some or all of the beam), passing some or all of the beam to the plasmonic layer 120, changing the polarization of beam passed to the plasmonic layer 120 and/or otherwise processing the incident RF/optical beam.

The embodiment of FIG. 2 differs from the embodiment of FIG. 1 primarily in that the plasmonic layer 120 comprises a plasmonic monolayer 123 in the embodiment of FIG. 2, but a plurality of plasmonic ribbons 121 in the embodiment of FIG. 1.

The LC layer 130 of FIGS. 1-2 may be formed using one or more of cholesteric liquid crystals (CLC), nematic liquid crystals, twisted nematic liquid crystals, smectic liquid crystal, swinging nematic liquid crystals, and the like. The beam passing through the LC layer 130 may comprise optical wavelength light and/or millimeter wavelength light, depending upon the application.

The optical/RF device 100 depicted in FIG. 1 utilizes plasmonic absorption/reflection of the plasmonic ribbons 121 (e.g. graphene ribbons, but not limited to graphene materials or ribbon structures) within the plasmonic layer 120 as dynamic (tunable/switchable) optical filters/optical switches. The device 100 may also be used in an RF (radio-frequency) regime with appropriate plasmonic layer 120 and substrate 110 materials; the LC layer 130 is selected to operate in both the optical and RF regions of the electromagnetic spectrum.

The spectral bands of operation of the optical/RF device 100 of FIG. 1 are controlled via one or both of the permittivity of the substrate 110 and plasmonic layer 120 materials surrounding the plasmonic ribbons 121, as well as the spacing/width 122 of the plasmonic ribbons 121.

SPP is an evanescent surface electromagnetic wave propagating along a surface; SPP can be localized. SPPs are observed in continuous metal films and isolated metal nanostructures. The SPP waves are confined to the metal-dielectric interface (approximately 200 nm from the interface). The resonant frequency is very sensitive to the refractive index variation at the interface.

In some embodiments, plasmonic structures formed as anisometric shapes (star-like, triangle, etc.) are used within the plasmonic layer 120, either with or without the plasmonic ribbons 121. In this case, the excitation of the surface plasmon polaritons (SPP) is different for different polarizations of the exciting light (i.e., the light incident upon the plasmonic layer 120 either directly or through the LC layer 130). The LC controls the polarization of the exciting light, and therefore are similar to ribbons in terms of controlling/tuning the SPP. In the case of ribbons the effect is strongly pronounced, because for one polarization the SPP is excited, but for the orthogonal polarization the SPP is not excited. In the case of anisometric plasmonic materials, or other geometrically anisotropic objects, the SPPs excited are different for different polarizations (not simply on or off as in the case of ribbons).

The plasmonic structures formed as anisometric shapes may be constructed from precise numbers of well-defined metal nanoparticles that are held together with molecular linkers, templates or spacers to form various anisometric shapes. The various plasmonic structures formed as anisometric shapes may include symmetrical particles such as spheres, less symmetrical particles such as stars and/or particles with a random shape. Such structures may be used to concentrate, guide and switch RF/optical wavelengths on the nanoscale in sensors and various other devices.

These particles can be put on top (or inside) an elastomer (e.g., elastomeric plasmon layer, elastomeric LC layer and the like), in which case the spatial arrangement of the particles may be controlled by light or external electric/magnetic field. In another embodiment, a liquid crystal host may be filled with these plasmonic material particles such that the reorientation of the LC director affects the excitation of plasmons in particles. In both cases finally one obtains a tunable plasmonic structure.

The LC layer 130 controls the polarization of the exciting light passed therethrough to the plasmonic layer 120, and thereby provides a mechanism for controlling/tuning the SPP effect. In the case of ribbons, the SPP effect is strongly pronounced because for one polarization the SPP is excited, but for the orthogonal polarization the SPP is not excited. Accordingly, the polarization of the excitation light is carefully selected. For example, in one embodiment of the invention the LC layer 130, in response to a first electric field or voltage level imparts a first polarization to a beam passing therethrough, and in response to a second electric field or voltage level imparts a second polarization to the beam passing therethrough. In one embodiment, the first and second polarizations are substantially orthogonal to each other such that in the first polarization the incident light is passed through the LC layer 130 to the plasmonic layer 120, resulting in an excitation light or beam incident upon the plasmonic layer material and causing the plasmonic material to exhibit SPP, whereas in the second polarization the resulting excitation light or beam incident upon the plasmonic layer material does not cause the plasmonic material to exhibit SPP. In various embodiments, the first polarization is perpendicular to a long axis of a graphene ribbon or other plasmonic material ribbon.

In the case of anisometric plasmonic materials, or other geometrically anisotropic objects, the SPP excitation is different for different polarizations (not simply on or off as in the case of ribbons). Specifically, in various embodiments the plasmonic material is formed within said plasmonic layer as one or more of a ribbon form, a monolayer form, a particle/colloid form and a nanoparticle/nanocolloid form. Suitable plasmonic materials may comprise one or more of graphene, gold, silver, copper, $VO_2$, and $V_xO_y$.

In various embodiments, three or more electric fields may be applied to the LC layer 130 such that respective three or more polarizations of the resulting excitation light or beam incident upon the plasmonic layer material may be provided. In various embodiments, the voltage or LC excitation source 140 controllably provides any of a number of excitation levels to the LC layer 130 to control polarization and other parameters associated with an optical/RF beam passing therethrough.

In the case of optical/RF filtering device embodiments, an illustrative notch filter (having single or multiple spectral notches) formed using the principles discussed above may be switched and/or tuned with applied fields and other stimuli. Advantageously, these devices operate independently of the input angle (operate at normal incidence or off-axis) of the incident light beam and do not require prism coupling/waveguiding to couple the light into the plasmonic material. Because these devices offer both strong absorption and reflection notches (narrow or broad band) in the spectrum, they can be used in a variety of optical architectures.

The various embodiments such as shown herein with respect to FIGS. 1-2 provide an optical filter/optical switch (including RF regions of the electromagnetic spectrum) that can be either switched off and on and/or spectrally tuned. These dynamic optical filtering/switching devices are based on the strong plasmonic absorption/reflection found in, for example, graphene (although not limited to graphene; other plasmonic materials can be used in a similar manner, e.g. gold, silver, copper, etc.), and the device can operate anywhere in the optical regime out to THz frequencies (millimeter wavelengths), depending on the substrate and plasmonic materials used. The full optical spectrum described above holds true for graphene ribbons under certain conditions of narrow ribbon width and spacing (e.g., 80 nm to 150 nm), and appropriate permittivity of the surrounding material. That is, for a given spectral range and ribbon width/spacing, by changing the optical properties (permittivity) of the surrounding material one can tune/control the position of the plasmonic frequency/wavelength. Unlike other optical filters/switches based on dielectric stacks or holograms, or even other types of plasmonic devices, this particular device based on plasmonic ribbon technology is, advantageously, angularly independent and will operate for any input angle of an incident light beam, including light at normal incidence.

The features described herein with respect to a tunable/switchable dynamic filter/switch are suitable for both optical and RF portions of the spectrum, where the polarization is controlled by liquid crystals (switching); the liquid crystals also control the permittivity of part of the surrounding material; and the polarization may be used to tune the wavelength. While a relatively small voltage (e.g., 1-5V or so) is typically sufficient to reorient the LC (depending upon the LC elastic constraints and dielectric anisotropy), a relatively large voltage (e.g., 10V-30V or so) is typically sufficient to control the gate tuning in the plasmonic layer. Thus, various embodiments comprise both a low-voltage switch and a high-voltage tuner (e.g., implemented via the LC excitation source 140). This apparent conflict is achievable, for example, through the application of an optically-induced high field in the substrate to create the SCF. Large fields and small fields may be achieved in the same device to drive two disparate mechanisms. Gating tuning of the graphene also provides a tunability of the absorption/reflection notch. The substrate material may be selected to provide sensitivity in different spectral regions based on their permittivity and absorption characteristics. These can operate in transmission or reflection geometries. The optical filter/switch improves upon prior static devices (i.e. dielectric stacks and holograms) and combines several techniques into one. Examples of suitable substrate materials include silicon, $SiO_2$, $Al_2O_3$, VO$_2$, V$_x$O$_y$, CdTe, and ITO, though the invention is should not be understood to be limited to these examples.

In other embodiments, the plasmonic material may form a plasmonic layer 120 that is included within the LC layer 130 such that there is not a distinct plasmonic layer 120 that is separate and apart (or adjacent to) the LC layer 130. Thus, every embodiment depicted and described herein (e.g., such as with respect to FIGS. 1-4) is to be considered as having embodiments with distinct plasmonic and LC layers 120/130 as well embodiments with integrated plasmonic and LC layers 120/130.

The use of the plasmonic absorption/reflection in plasmonic ribbons in conjunction with liquid crystals provides dynamic (tunable/switchable) optical/RF properties. The spectral band of operation can be controlled by both the permittivity of the surrounding materials and the spacing/width of the plasmonic ribbons. The region of plasmonic absorption/reflection can fall in the range from 100's (UV/visible light) of nm to millimeter waves (THz). The resultant notch filters can be switched and tuned with applied fields. For the case of some materials, like graphene, the spectral tuning is also a product of gate tuning, where the applied field controls the Fermi level/conductivity of the graphene, which in turn changes the permittivity of graphene. In addition, an applied electric or magnetic field can switch the liquid crystal orientation, creating an optical switch for the plasmonic effect, as well as modifying the surrounding permittivity on the plasmonic layer, which also gives an additional control of the absorbing/reflecting wavelengths.

There are three key mechanisms in the dynamic properties of these devices (FIGS. 1-2):

Twisted nematic or cholesterics liquid crystals can rotate the light polarization such that the E-field is perpendicular to the ribbon long axis to excite plasmons. The LC director controls "switchability" of the absorption/reflection notch: 100% to 0% transmission is possible; e.g. π/2 twists, but not limited to π/2 twists.

Plasmon frequency depends on dielectric constants of the layers on top of and below the plasmonic material (e.g., the substrate layer 110 and LC layer 130 having the plasmonic layer 120 sandwiched therebetween); this can be controlled by reorienting the LC director on top. Different substrates will also dictate the spectral region of the effect. Other materials can be used to modify permittivity under stimuli, e.g. VO$_2$/V$_x$O$_y$ and other phase change materials. With regard to VO$_2$ phase change materials, both the real and imaginary part of the index of refraction exhibit huge changes.

Gate tuning—E-field controls Fermi level/conductivity (tunes notch frequency).

In various embodiments, the plasmonic layer 120 comprises a deformable (bendable) plasmonic layer mechanically cooperating with a deformable LC layer and configured to expand or contract in response to an applied stimuli. In these embodiments, deformation of deformable plasmonic layer operates to change a geometry of the plasmonic material formed therein (e.g., increasing the width of spaces 122 between ribbons 121) such that SPP excitation may be further controlled/modified.

In various embodiments, the elastomer characteristic of the plasmonic layer is realized by one or more components disposed within the spaces 122 (described below) of the deformable plasmonic layer 120.

In various embodiments, the LC layer 130 comprises a deformable elastomeric LC layer which mechanically cooperates with a deformable plasmonic layer 120. For example, an LC elastomeric layer may be placed between a Bragg mirror made of TiO2-SiO2 layers and metallic layer where a 10% strain in the elastomer results in about a 50 nm shift of the plasmonic notch. A higher strain will produce a bigger shift.

In various embodiments, the plasmonic layer comprises a stack of plasmonic material ribbon layers separated by at least one of tunable dielectric layers, metallic layers, and phase change layers.

In various embodiments, the plasmonic material comprises a metallic layer having disposed thereon a distributed Bragg mirror configured to excite Tamm plasmons therebetween when exposed to an incident light beam. The distributed Bragg mirror may comprise a stack of dielectric layers wherein the thicknesses of each layer multiplied by the refractive index of the respective layer is equal to one fourth of the wavelength of the incident light beam. The distributed Bragg mirror may further comprise a metallic layer disposed within the stack of dielectric layers. In various embodiments, the Bragg mirror is replaced by a CLC within the LC layer (optionally including plasmonic material within the same LC layer), optionally a tunable CLC that is tunable as described herein such that an optical/RF switch or filter device may be realized.

Various embodiments advantageously utilize Tamm plasmon excitation. Specifically, Tamm plasmon are excited between metallic layer (metallic mirror) and distributed dielectric Bragg mirror (stack of dielectric layers with thickness of a layer multiplied by the refractive index of that layer=lambda/4). Tamm plasmons can be excited by both the TE and TM polarizations. Tamm plasmons dispersion lies within the light cone, therefore they can be optically excited without a need in prism or grating. Various embodiments contemplate tuning Tamm plasmons, and therefore the reflectance, transmittance and absorption, by using a phase changing material (e.g. VO$_2$) instead of a metallic layer or as one of the dielectric layers, and by positioning a liquid crystal layer adjacent to the Distributed Bragg Mirror or replacing the Distributed Bragg Mirror with a cholesteric liquid crystal.

In various embodiments, the spaces 122 between the graphene ribbons 121 are filled with VO$_2$ such that plasmons are excited and controlled/tuned in a system having a "graphene-VO$_2$" boundary. In a similar embodiment, the space 122 between the graphene ribbons 121 are filled with MoS$_2$ such that plasmons are excited and controlled/tuned in a system having a "graphene-MoS$_2$" boundary. Alternatively graphene or other substantially two-dimensional (flat) materials may be placed, individually or stacked, on top of VO$_2$ to provide other graphene ribbons-gap material (e.g., Al$_2$O$_3$, Si, CdTe and the like)-VO$_2$. Plasmons wavelength is determined by ribbons, gap material and VO$_2$, such that changing conductivity of VO$_2$ results in tuning of plasmons.

In various embodiments, field generating (photo-generating) materials may be used, wherein the fields generated by these materials may be used to tune the plasmonic excitation and control the liquid crystals directly (i.e., without using a generated electric field or voltage).

Various embodiments may utilize one or more additional (or replacement) control mechanisms, such as embodiments using phase changing materials and liquid crystal elastomers. With a liquid crystal elastomer, the ribbon spacing may be dynamically controlled. An example of such an architecture is ribbons on top of an elastomer. One can elongate or shrink the elastomer with the light or other stimuli; accordingly, the distance between the ribbons changes and controls the SPP.

Various embodiments utilize liquid crystals on top of ribbons in a bi-stable configuration, switchable by electric fields, magnetic fields, pressure or temperature (e.g., external thermal source or absorbing dyes, so in one state the SPP (Surface Plasmon Polaritons or Localized Surface Plasmons) are excited while in the other state the SPPs/LSPs are not excited.

Use of different substrates and liquid crystals may be employed to generate large changes in the surrounding permittivity and other parameters affect the plasmonic response.

Ribbons on top of $VO_2$. $VO_2$ and other forms of $V_xO_y$ are capable of a reversible phase transition between an insulating state and a metallic state that can be initiated thermally, electrically, or optically. This allows for large changes in permittivity in the same host material, which would affect large shifting and tuning of the plasmonic absorption/reflection, making for a device that could operate in drastically different spectral ranges without the need of changing the substrate host materials.

Additional elements may be used to introduce stimuli to LC or plasmonic layers to further control the SPP. A $TiO_2$ layer (as an example) may be used with heating from conductive to dielectric behavior. In the conductive state, it would be similar to Au. Alternatively, if a $VO_2$ layer is used, the behavior would be dielectric to conductive. By changing the temperature via heating one can switch $VO_2$ from semiconductor to metal state (the phase transition temperature is around 68° C.).

Photovoltaic and/or photorefractive layers adjacent the plasmonic ribbons may also be used to provide a change of charge/permittivity in homogeneous, inhomogeneous, and more specifically-patterned structures. Furthermore, other responsive materials (e.g. piezoelectric or pyroelectric, pyroelectric, thermophotovoltaic, etc.) with external stimuli can induce surface charge to control plasmons (i.e. graphene plasmonic materials). In the case of the patterned inhomogeneous space charge fields generated in substrate materials, a dynamic or static grating (in phase or out of phase) can provide the means for coupling the light, without the need of ribbons, prisms, or waveguides. The same effect described herein may also be applied to mono- and continuous-layered plasmonic materials, e.g. in monolayer graphene and sheets of gold.

Accordingly, the ribbon-like structure does not have to be deposited in ribbon form or etched, because the dynamic grating-like structure in the materials, e.g. photovoltaic, photorefractive, or structured phase-change substrates (with or without interdigitated electrodes) would provide a means of tuning & controlling the periodicity in the systems.

Figure 4B:
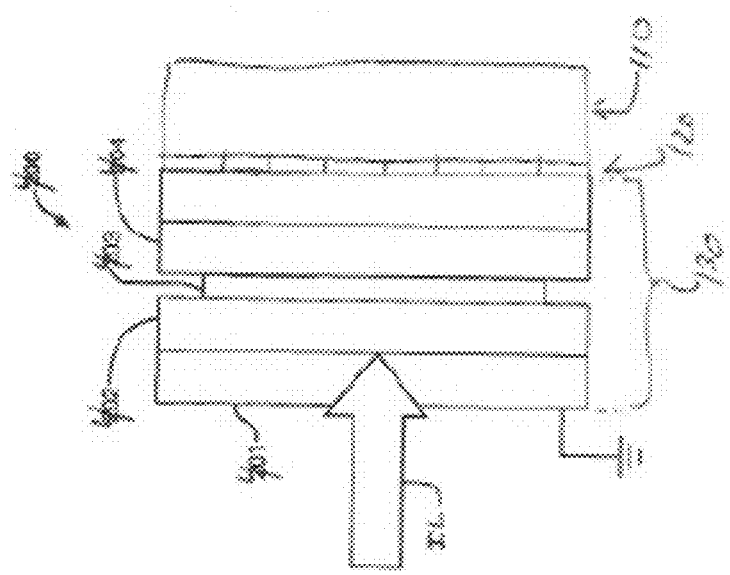
FIG. 4B depicts the photoconductive device of FIG. 4A being illuminated.
Figure 4A:
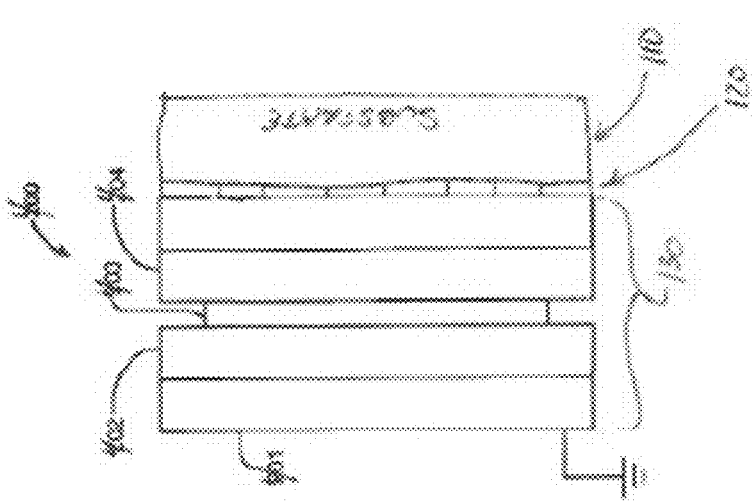
FIG. 4A depicts a photoconductive device according to an embodiment.
Figure 5:
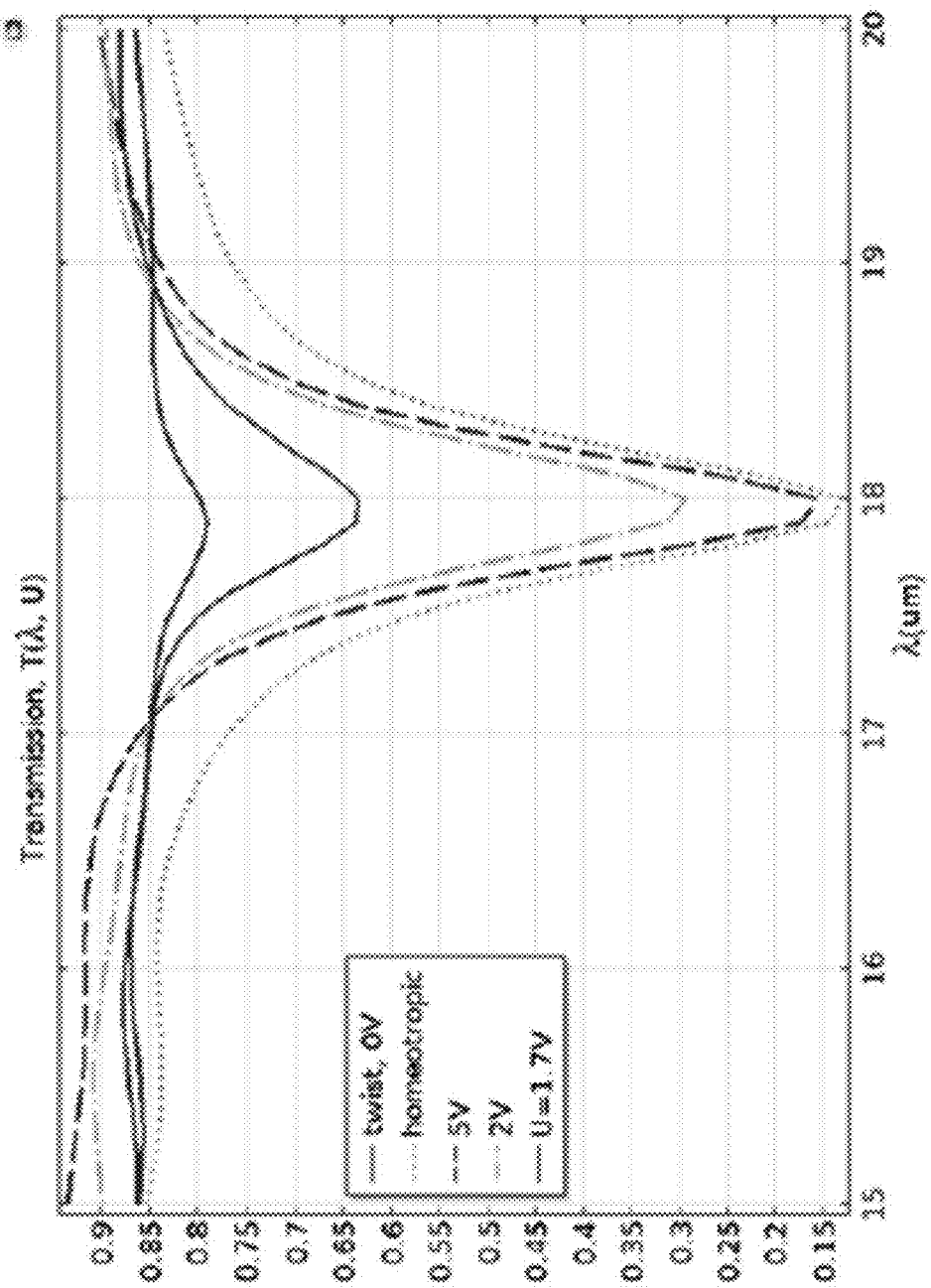
FIGS. 5, 6A and 6B graphically depict an effect of ribbon and spacing width on the plasmonic absorption band of the embodiment of FIG. 1.
Figure 6A:
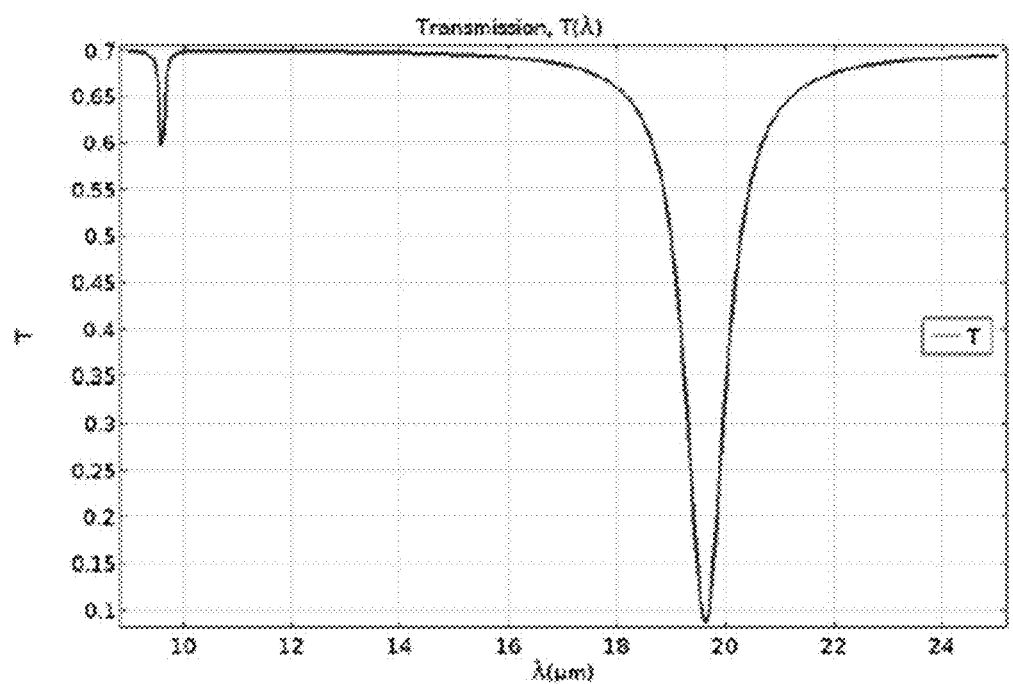
Figure 6B:
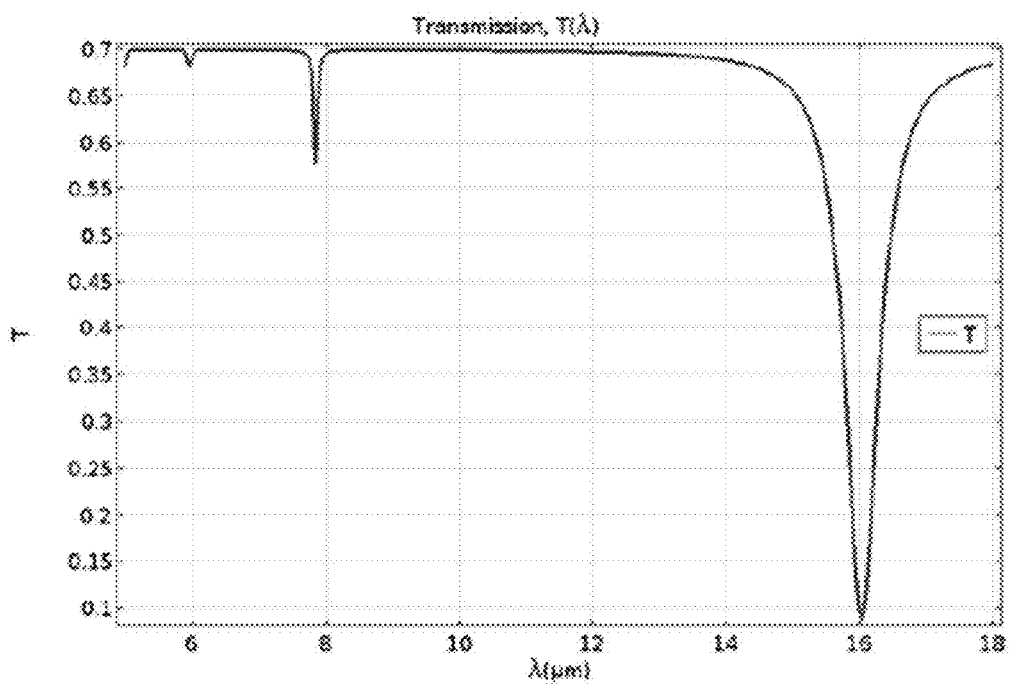

FIGS. 5-6B graphically depict an effect of ribbon and spacing width on the plasmonic absorption band of the embodiment of FIG. 1. Specifically, FIGS. 3-4 illustrate the effect of ribbon and spacing width on the plasmonic absorption band (reflection band not shown here). This is shown for a particular substrate material; varying the materials and/or geometries will provide different regions of spectral coverage.

Figure 7:
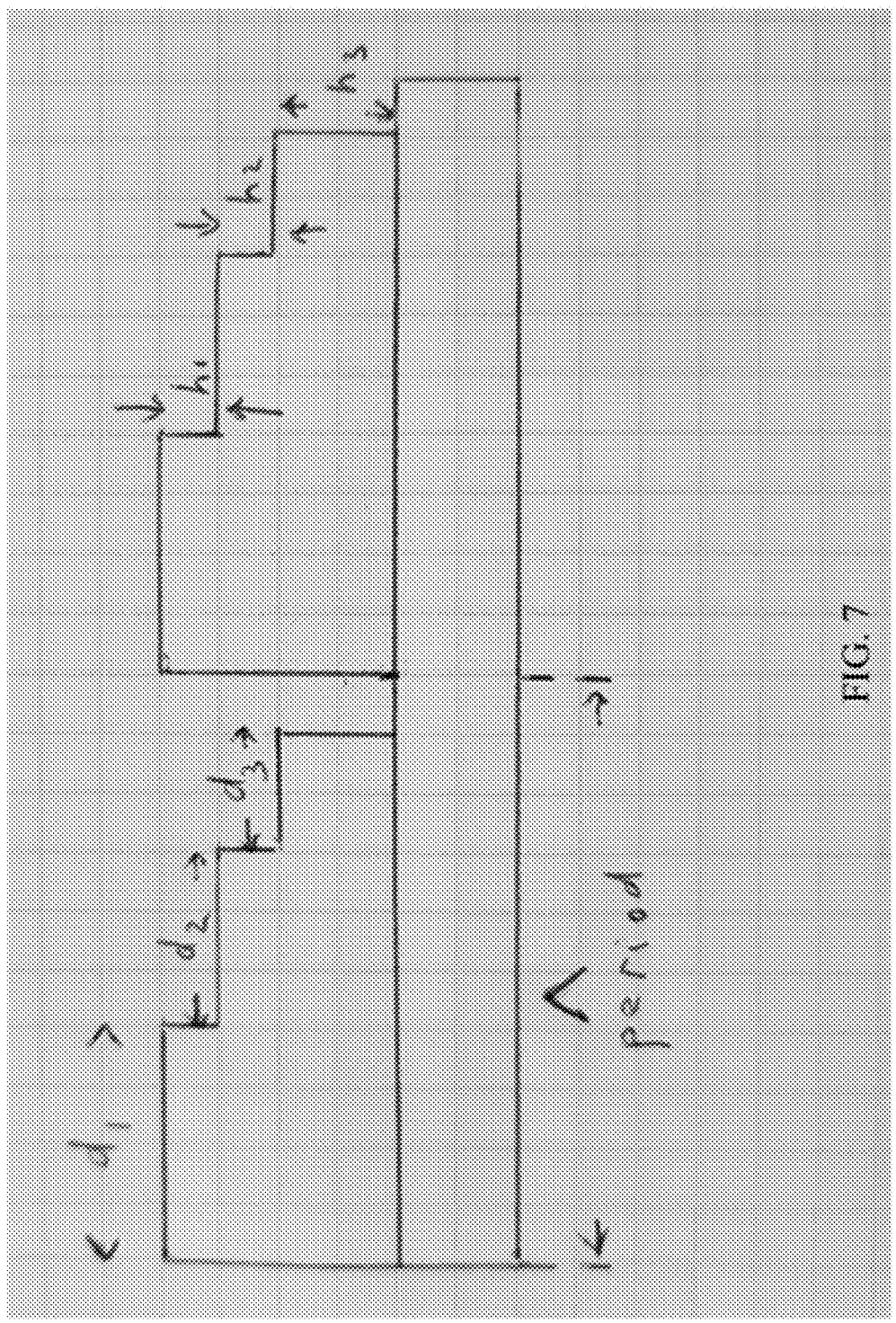
FIG. 7 depicts illustrative examples of complex patterns suitable for use in providing addition plasmonic frequencies within the context of various embodiments.

FIG. 7 depicts examples of complex patterns that can provide addition plasmonic frequencies to a single dynamic optical filter/switch device. In particular, FIG. 7 shows an example of a periodic structure made of three constituent elements, however the number of constituent elements and their geometry may be varied depending on the desired plasmonic frequencies and their (frequencies) mutual arrangement.

Referring to FIG. 1, the ribbon architecture depicted therein is not limited to graphene. Mono/continuous layers (see FIG. 2) of a plasmonic material may be used where the ribbon-like (periodic) nature is the result of the grating in a periodic space charge field (SCF) created in the substrate, e.g. illumination $LiNbO_3$ (or other photorefractive/photovoltaic) substrate with two interfering light beams. This periodic SCF gives a period change to the permittivity and mimics the ribbon structure. A material capable of generating plasmons can be deposited in ribbons or as a uniform layer that is etched to provide the ribbon structure. SCFs are created optically and the phase change materials may be triggered with various methods described herein. In terms of the periodic SCF effects on plasmonics, this field can affect the plasmonic layer by changing the concentration of charge carriers in the plasmonic layer, e.g. in a graphene layer this called gate-tuning. Fermi energy in graphene depends on the charge concentration, $E\_f \sim sqrt(carrier\ density)$. A similar change in the carriers concentration (and so the plasmonic frequency) can be done for ZnSe ($Omega\_p \sim sqrt(concentration\_of\_charges)$).

To achieve tuning, a stack of graphene or other plasmonic ribbons (with different orientations of the ribbon long axis) is separated by tunable dielectrics (e.g. LC nano-PDLC, $VO_2$, $V_xO_y$, etc.), or metallic layers (gold, silver, copper, etc.)

Complex patterns can be used to give multiple plasmonic frequencies (see FIG. 7 as an example). This same technique can be applied to the filter/switch device described within this document. Such structures may be used to shift/broaden the resonance, and may provide multiple plasmonic frequencies (resulting in multiple absorption/reflection bands), it can provide narrow or broad bands, and even chirped structures.

FIG. 7 depicts illustrative examples of complex patterns (i.e., multi-step grating) suitable for use in providing addition plasmonic frequencies within the context of various embodiments, such as a single dynamic optical filter/switch device.

Furthermore, complex patterns, such as for a set of nano-antennas of different geometries (cubes, pyramids, etc.), may yield tailored plasmonic responses and a geometrical anisotropy that makes the system sensitive to the direction of light polarization.

It is also possible to have a broad tuning range, e.g. from visible to millimeter waves, by using multiple devices with different substrate materials—the surrounding media will control the spectral region where the plasmons will be generated and the other mechanism, e.g. heating, described above can tune the plasmonic absorption and reflection in that region.

Because of having both absorption and reflection bands, these devices may operate in different configurations; namely, with a transmission geometry, a reflection geometry, or both.

Tuning may be achieved by using a stack of graphene ribbon layers, with different orientations of the ribbon long axes, separated by tunable dielectrics, e.g. LC nano-pdlc, $VO_2$, and/or metallic layers (gold, silver, copper, etc.). Furthermore, multilayered structures of metal (Ag, Au, Cu, etc.) and dielectric layers may be used in conjunction with plasmonic materials such as graphene. Here, the graphene may be substituted for a metal (e.g. Au) as a layer in a metallodielectric structure. This would control both real and imaginary parts of the index of refraction.

Regarding the use of liquid crystals with reversible "handedness". Handedness-invertible CLCs (cholesteric liquid crystals) through opposite-handed doping of a photo-sensitive chiral azobenzene dopant and a photo-stable chiral dopant; light sensitive dopants change the twist and in turn the incoming light polarization. This is an alternative means of changing the polarization. This can be thought of as light self-action, if the same light changes the twisting power or handedness and excites SPP. Alternatively, multiple light sources and/or wavelengths may be used where one wavelength/source changes the twist, while another wavelength/source excites SPP.

Devices made according to these principles have numerous advantageous operating characteristics which are listed below and discussed herein.

Dynamic gratings in photovoltaic/photorefractive substrates or LC based space light modulators (SLM) can provide a periodic modulation in dynamically changeable direction, such that the direction of the SPP propagation can be controlled. It is not possible to change the direction of the SPP propagation using geometrical grating.

Dynamic Optical Filter/Optical Switch operation in various optical architectures with broad or narrow absorption and reflection bands.

Dynamic Optical Filter/Optical Switch based on plasmonic absorption/reflection in ribbons of plasmonic materials, e.g. graphene but not limited to graphene, is functional at any angle, including normal incidence, in transmission geometries.

Dynamic Optical Filter/Optical Switch based on plasmonic absorption/reflection in ribbons of plasmonic materials, e.g. graphene but not limited to graphene, is functional at any angle, including normal incidence, in reflection geometries.

Dynamic Optical Filter/Optical Switch is operational over wavelengths from 100's nm (UV/visible light) to millimeter waves (THz), providing narrow or broad band absorption or reflection bands.

The above performance characteristics also hold true for RF frequencies, resulting in devices that can operate across the full electromagnetic spectrum.

The use of anisometric shapes (star-like, triangle, etc.) may be used. In this case, the excitation of the surface plasmon polaritons (SPP) is different for different polarizations of the exciting light.

Plasmonic devices that may be switched off/on or tuned spectrally with operation at any angle of incidence, including incidence normal to the plane of the device; a spectral range of operation is defined by the surrounding material, including an anisotropic media that can change permittivity under the influence of a field, e.g. liquid crystals, and the ribbon width/spacing.

Plasmonic optical filter/optical switch that does not require prism coupling/waveguiding to couple the light into the plasmonic material.

Dynamic Optical Filter/Optical Switch that overcomes the angular limitations of dielectric stacks and holograms, and is angularly independent.

An optical device according to the principles described herein may have any combination of the following mechanisms/dynamic properties:

$\pi/2$ twist the light polarization (twist-nematic liquid crystals) E-field perpendicular to ribbon long axis to excite plasmons (LC director controls "switchability" of the absorption/reflection notch—100% to 0% transmission is possible. Electric field vector E provides the light polarization direction.

Plasmons frequency depends on dielectric constants (LC/substrate layers)—the dielectric constant)—this can be controlled by reorienting the LC director on top. Different substrates will also dictate the spectral region of the effect. Other materials may be used to modify permittivity under external stimuli.

Gate tuning—E-field controls Fermi level/conductivity (tunes notch frequency).

An additional (fourth) mechanism in the form of dynamically-controlled substrates may be used, e.g. phase changing materials and liquid crystal elastomers. With liquid crystal elastomer the ribbon spacing may be dynamically controlled. An example of such architecture is ribbons on top of an elastomer. One may elongate/shrink the elastomer with the light or other stimuli; the distance between the ribbons changes and controls the SPP.

Use of liquid crystals on top of ribbons in a bi-stable configuration (similar to an e-book), switchable by electric fields, magnetic fields, pressure or temperature (external thermal source or absorbing dyes), so in one state the SPP is excited while in the other state the SPP is not excited.

Ribbons on top of $VO_2$ (or $V_xO_y$) may be used to provide additional dynamic control permittivity to allow for shifting and tuning over a broad range of frequencies. The use of other plasmonics in ribbon structure to cover different spectral regions, e.g. gold or silver ribbons.

Additional elements may be used to introduce stimuli to the LC or plasmonic layers to further control the SPP. For example, a $TiO_2$ layer may be used with heating from conductive to dielectric behavior. In the conductive state, it would be similar to Au.

Substrates may be selected to provide patterned space charge fields to produce a grating structure; the resulting ribbon structures may be replaced by mono- or continuous plasmonic layers, e.g. photovoltaic and/or photorefractive layers adjacent the plasmonic ribbons also provide a change of charge/permittivity in homogeneous, inhomogeneous, and more specifically patterned structures. Other responsive materials, e.g. piezoelectric or pyroelectric, pyroelectric, thermophotovoltaic, etc., with external stimuli may be used to induce surface charge to control plasmons, i.e. graphene plasmonic materials.

Patterned inhomogeneous space charge fields may be generated in the substrate materials to form a dynamic or static grating, i.e. in phase or out of phase, to provide the means for coupling the light, without the need of ribbons, prisms, or waveguides. The same effect described throughout this document could also be applied to mono- and continuous layered plasmonic materials, e.g. in monolayer graphene and sheets of gold.

Ribbon-like structures may be created from materials deposited in ribbon form or etched. Alternatively, dynamic grating-like structures in the substrate materials, e.g. photovoltaic, photorefractive, or structured phase change substrates (with or without interdigitated electrodes) may provide a means of periodicity to a mono/continuous plasmonic layer.

Mono/continuous layers may be used where the ribbon-like nature is a result of the grating in a periodic space charge field (SCF) created in the substrate. This periodic SCF may give a period change to the permittivity and mimic the ribbon structure.

Complex patterns (in the plasmonic layer) may be used to give multiple plasmonic frequencies resulting in multiple absorption/reflection bands, to provide narrow or broad bands, and chirped structures. Complex patterns like, for example, a set of nano-antennas of different geometry (cubes, pyramids, etc.) can be used to result in tailored plasmonic responses and a geometrical anisotropy that makes the system sensitive to the direction of light polarization.

In addition, anisometric shape (star-like, triangle, etc.) may be used. For these, the excitation of the surface plasmon polaritons (SPP) is different for different polarizations of the excitation light. The LC controls the polarization of the excitation light, and therefore are similar to ribbons in terms of controlling/tuning the SPP. In the case of ribbons, the effect is strongly pronounced because for one polarization the SPP may be excited, but for the orthogonal polarization the SPP is not excited. In the case of anisometric plasmonic materials, or other geometrically anisotropic objects, the SPP excitation is different for different polarizations (not simply on or off as in the case of ribbons). For all cases, the resultant notch filter (single or multiple spectral notches).

Tuning may be accomplished with a stack of graphene or other plasmonic ribbons (with different orientations of the ribbon long axis) separated by tunable dielectrics (e.g. LC nano-PDLC, $VO_2$, $V_xO_y$, etc.), metallic layers (gold, silver, copper, etc.). A multilayered structure of metal (Ag, Au, Cu, etc.) and dielectric layers may be used in conjunction with plasmonic materials like graphene or a metal, e.g. Au, as a layer in a metallodielectric structure. This would provide a means to control both real and imaginary parts of the index of refraction.

Liquid crystals with reversible "handedness" may be used. A handedness-invertible CLC through opposite-handed doping of a photo-sensitive chiral azobenzene dopant, for example, and a photo-stable chiral dopant; light sensitive dopants change the twist and in turn the incoming light polarization.

Light self-action may also be used, wherein the same light both changes the twisting power or handedness and also excites SPP. Alternatively, multiple light sources and/or wavelengths may be used where one wavelength/light source changes the twist, while another wavelength/light source excites SPP.

Dynamic gratings in photovoltaic/photorefractive substrates or LC-based space light modulators (SLM) may also be used to provide a periodic modulation in a dynamically-changeable direction, such that the direction of the SPP propagation can be controlled.

To recap, placing a liquid crystal (LC) layer on top of monolayer graphene (or other monolayer plasmonic material) or graphene ribbons allows control of the generation of plasmons in the graphene by using different LC director profiles (anchoring) and by varying the voltage applied to LC layer. All optical control is possible in a cell with light sensitive chiral dopant or anchoring. Other means of LC reorientation may be employed, such as using tunable gratings (e.g. HPDLC) to tune plasmons. A grating may be made of periodically poled photorefractive material ($LiNbO_3$) with an LC layer on top. This scheme may be used in tunable mid-IR or THz modulators and filters.

Control of SPP in a graphene monolayer and ribbon array is performed by controlling the geometry and other parameters of a device. SPP in, for example, graphene ribbons is polarization sensitive; the LC is able to change the polarization of the light used to excite the plasmonic layer and to thereby control SPP excitation. The LC may be controlled via an electric field which operates to reorient the LC, such as twist to planar (and planar to twist), twist to homeotrop (and homeotrop to twist), twist to homeo-planar (and homeo-planar to twist) and so on. The LC may be further controlled with light, such as if be doped with a light sensitive chiral dopant, or via anchoring (e.g., electric field or light sensitive anchoring).

Plasmons frequency in a graphene monolayer, m-order of SPP mode is described by the following equation 1:

$$\omega_m = \sqrt{\frac{2e^2 E_F m}{\hbar^2 \varepsilon_0 (\varepsilon_1 + \varepsilon_2) \Lambda}} \quad \text{(eq. 1)}$$

Plasmons frequency in a graphene monolayer, m-order of SPP mode is described by the following equation 2:

$$\omega_p \approx \sqrt{\frac{2e^2 E_F}{\hbar^2 \eta \varepsilon_0 (\varepsilon_{r1} + \varepsilon_{r2}) w}} \quad \text{(eq. 2)}$$

where: e is the electron charge, h is Planck's constant, $\omega$ and q are the surface wave frequency and wave-vectors $\varepsilon_1$ is the dielectric constant of dielectric layer below the conducting surface, $\varepsilon_2$ is the dielectric constant of the dielectric surface above the conducting surface, $\sigma$ is the surface conductivity, $\Lambda$ is the grating period, $E_F$ is the Fermi energy level, w=ribbon width.

The LC director profile can be controlled by applying a voltage; under an applied field, the LC director becomes spatially inhomogeneous which affects the electromagnetic wave propagation and plasmons frequency. Of significance with respect to the plasmons frequency is that the director orientation in the vicinity of the graphene layer ribbons be close to the length axis of the graphene layer ribbons. It is desirable to get the maximum director reorientation upon an applied voltage at the LC-graphene interface, either from 0 to 90 degrees or vice versa. The LC director orientation at a surface is determined by the balance of the bulk elastic torque, electric field torque, and torque due to the LC anchoring at the surface.

Doping the LC (e.g., a nematic LC) with cetyltrimethyl ammonium bromide (CTAB) results in a homeotropic alignment (i.e., LC director is oriented perpendicular to substrates) due to CTAB monomolecular layers of cations adsorbed on the surface of the substrates. Once the electric field is applied above some magnitude, one of the substrates in the static electric field becomes free of a cation layer and reveals planar boundary conditions at that substrate; as a result, a homeo-planar orientational transition occurs. A graphene layer provides planar LC director anchoring such that CTAB doping of LC placed between an array of graphene ribbons and a substrate may allow electric switching from homeotropic to homeo-planar orientation or from homeo-planar to planar orientation. Further, the presence of CTAB and its redistribution upon the applied voltage may affect the Fermi energy of the graphene ribbons and additional plasmons tuning may occur due to graphene gating.

FIGS. 5-6 graphically depict an effect of ribbon and spacing width on the plasmonic absorption band of the embodiment of FIG. 1. In particular, FIG. 5 depicts transmissivity T as a function of wavelength (i.e., spectral region transmission properties) of an exemplary transmissivity of an exemplary graphene ribbon embodiment such as depicted in FIG. 1 wherein the grating period is 200 nm and the ribbon width is 100 nm; the wavelength scaling substantially in accordance with the square root of the ribbon width. It is noted that there are several curves indicative of the following modifications (i.e., from the top curve to the bottom curve at the notch proximate 18 um): a twist nematic at U=0V, U=1.7V, U=2V, U=5V and homeotropic. Similarly, FIGS. 6A-6B depict a shift in the transmissibility "notch" from approximately 19.5 um (FIG. 6A) to 16 um (FIG. 6B) in response to changes imparted to light by the LC.

The various examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Autonomous Tuning Embodiments

The various embodiments described above with respect to FIGS. 1-6 may be further enhanced by using photoconductive, photovoltaic, and other photoactivated materials to generate photoinduced electric fields that can be used to control the tuning of liquid crystals.

For example, various embodiments described above provide a liquid crystal (LC) layer placed above or below a plasmon layer (e.g., a periodic array of graphene ribbons, a monolayer and so on) to enable the tuning of the surface plasmons by varying the voltage applied to the LC to realize thereby devices such as tunable mid-IR, far-IR or THz modulators and filters. Further tuning of the plasmons may be realized by tuning/controlling the LC layer 130 of the various embodiments by further adding (or only using) photoactivated organic or inorganic bulk or epitaxial materials to generate or control photoinduced electric fields to control the tuning of cholesteric, nematic, smectic, and other liquid crystals and liquid crystal-like materials, autonomously. In this manner, control of plasmonic excitation may also be controlled/tuned such as by using the self-tuning devices as described below, as well as similar types of devices, to implement LC layer 130 functions within the context of the above-described devices.

Tunable liquid crystal filters that vary the electrical-optical properties of liquid crystal materials have a variety of uses. Currently, tunable liquid crystals use direct current (DC) fields to control the tuning of an active system. Such tunable liquid crystal filter systems are limited by the fact that the optical wavelength must be known a priori and the tuning must be controlled by an electric device such as by cueing to tune the liquid crystal medium to filter the optical wavelength that is anticipated.

The self-tuning devices disclosed herein overcome these limitations through the use of photoactivated materials, such as photoconductive and photovoltaic materials, to generate or control an electric field to autonomously tune a liquid crystal material to filter different wavelengths of light. Organic and inorganic photoconductive or photovoltaic substrates or epitaxial films are used to apply a tuning electric field so the incident light or radiation directly controls the field applied to the liquid crystal. This arrangement allows the use of photoconductive, photovoltaic, and other photoactivated materials to generate or control an electric field for autonomously tuning a liquid crystal filter system such that incident light or radiation above a given threshold intensity is automatically blocked with no external monitoring required of the incident light or radiation and no external control required for the filter wavelength.

Photoconductive, photovoltaic, and other photoactivated materials, such as pyroelectric, thermophotovoltaic, and piezoelectric materials, can be made as bulk materials, substrates, or epitaxial films of organic or inorganic materials that autonomously control the electric tuning of the liquid crystal material. Liquid crystal materials include cholesteric, nematic, or smectic liquid crystals having a positive or a negative dielectric anisotropy, and other polymer dispersed and polymer stabilized liquid crystals and materials with liquid crystal-like, birefringent, field dependent absorption/reflection, or scatter properties.

As disclosed herein, an example of an autonomously-tuned optical filter comprises a liquid crystal; and a photo-activated material, wherein the photoactivated material produces or controls an electric field when illuminated by electromagnetic radiation and the electric field tunes the liquid crystal to the wavelength of the electromagnetic radiation, thereby filtering the electromagnetic radiation.

As further disclosed herein, a liquid crystal filter comprises a glass window having an electrically-conductive layer that is positioned on its rear surface and that is connected to a negative source of electrical energy; a liquid crystal material having a front surface and a rear surface wherein the front surface is positioned adjacent to the electrically-conductive layer of the glass window; and a photoconductive window having a front surface positioned adjacent to the rear surface of the liquid crystal material and a rear surface with an electrically-conductive layer that is connected to a positive source of electrical energy, wherein the electrically-conductive layer on the rear surface of the glass window and the electrically-conductive layer on the rear surface of the photoconductive window create or control an electric field across the liquid crystal material.

A method of autonomously tuning a liquid crystal comprises the steps of: illuminating a liquid crystal filter comprising a liquid crystal material and a photoactivated material with electromagnetic radiation whereby the photoactivated material produces or controls an electric field; applying the electric field to the liquid crystal material; and using the electric field to tune the liquid crystal material to the wavelength of the incident electromagnetic radiation so the liquid crystal material autonomously filters the electromagnetic radiation and prevents it from illuminating the photoactivated material.

An electrically-induced absorption or reflection filter comprises: a glass window having an electrically-conductive layer positioned on its rear surface and connected to a negative source of electrical energy; a material with electrically-induced absorption or reflection properties having a front surface and a rear surface wherein the front surface is positioned adjacent to the electrically-conductive layer of the glass window; and a photoconductive window having a front surface positioned adjacent to the rear surface of the electrically-induced absorption or reflection material and a rear surface with an electrically-conductive layer that is connected to a positive source of electrical energy, wherein the electrically-conductive layer on the rear surface of the glass window and the electrically-conductive layer on the rear surface of the photoconductive window create or control an electric field across the field dependent absorption or reflection material.

An electrically-induced scatter filter comprises: a glass window having an electrically-conductive layer that is positioned on its rear surface and that is connected to a negative source of electrical energy; a material with electrically-induced scatter properties having a front surface and a rear surface wherein the front surface is positioned adjacent to the electrically-conductive layer of the glass window; and a photoconductive window having a front surface positioned adjacent to the rear surface of the electrically-induced scatter material and a rear surface with an electrically-conductive layer that is connected to a positive source of electrical energy, wherein the electrically-conductive layer on the rear surface of the glass window and the electrically-conductive layer on the rear surface of the photoconductive window create or control an electric field across the field dependent absorption or reflection material.

Photoinduced or photoactivated materials suitable for the autonomously tuned optical filters disclosed herein include photoconductive, photovoltaic, pyroelectric, thermophotovoltaic, and piezoelectric materials in substrates or epitaxial layers.

In particular, various embodiments of the RF/optical devices described above with respect to FIGS. 1-2 and 5-7 may be modified to include an LC layer 130 configured as an autonomously-tuned optical filter as described below with respect to FIGS. 3-4, and operative to control various properties of light passing therethrough and incident upon the plasmonic layer 120 (formed in any manner such as described above) and substrate 110.

Figure 3A:
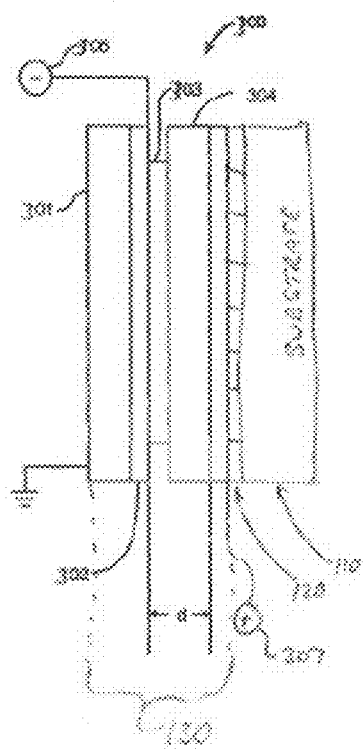
FIG. 3A depicts a photoconductive device according to an embodiment.

A photoconductive device 300 may comprise a glass window 301 having an electrically-conductive coating 302 on its rear surface, a liquid crystal material 303, and a photoconductive window 304 having an electrically-conductive coating 305 on its rear surface, as shown in FIG. 3A. The electrically-conductive coatings 302, 305 comprise an indium-tin oxide, indium oxide, or other optically-transparent material that provides electrically-conductive surfaces on the glass window 301 and photoconductive window 304 with good optical transparency. The glass window 301 is electrically grounded. The electrically-conductive coating 302 on the glass window 301 is connected to a negative source of electrical energy 306 to serve as a negative electrode. The electrically-conductive coating 305 on the photoconductive window 304 is connected to a positive source of electrical energy 307 to function as a positive electrode. The photoconductive window 304 comprises a photoconductive material such as gallium, germanium, selenium, doped silicon, metal oxides, sulfides, or another material whose electrical conductivity increases with absorption of electromagnetic radiation such as visible light (coherent or incoherent, narrowband or broadband, e.g., sunlight), ultraviolet light, infrared light, laser light, or gamma or x-ray radiation. The glass window 301 may comprise polarized glass, which may induce circular polarization for use with cholesteric liquid crystals, or may induce linear polarization for nematic liquid crystal devices. Alternatively, the device shown in FIG. 3A may be duplicated in series such that each sub-device acts independently on one polarization state; this expedient eliminates the need to incorporate circular polarization elements when the device is used with cholesteric liquid crystals. The liquid crystal 303 comprises an electrically-tunable cholesteric, nematic, or smectic liquid crystal having a positive or a negative dielectric anisotropy, an electrically tunable polymer stabilized cholesteric, nematic, or smectic liquid crystal having a positive or a negative dielectric anisotropy, or an electrically tunable polymer dispersed cholesteric, nematic, or smectic liquid crystal having a positive or a negative dielectric anisotropy. Depending on the media, the device may function as a spectral (e.g., reflective cholesteric filter) or spatial (e.g., nematic field dependent optical scattering) filter.

When electrical energy is applied to the conductive coatings 302, 305, an electric field is produced or modified between the conductive coatings 302, 305 and across the liquid crystal material 303. The electric field that is produced between the conductive coatings 302, 305 is defined as E=V/d, where V=Voltage and d=the thickness of nonconductive material between the conductive coatings 302, 305. When no light or electromagnetic radiation illuminates the photoconductive device 300, the thickness "d" is the distance between the electrically-conductive coating 302 on the glass window 301 and the electrically-conductive coating 305 on the photoconductive window 304. In this example, the thickness "d" of the nonconductive material is the combined thicknesses of the liquid crystal material 303 and the photoconductive window 304.

Figure 3B:
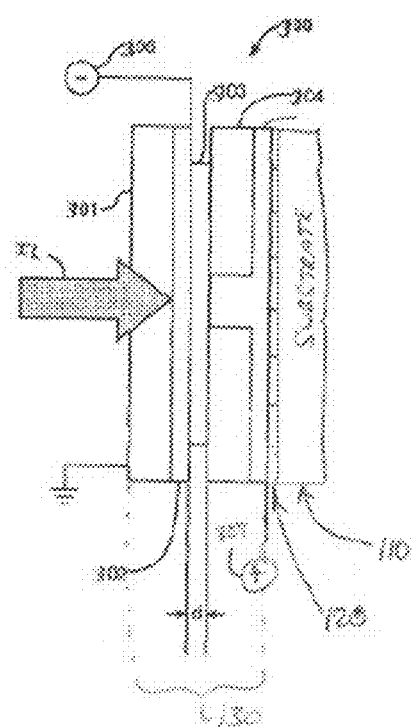
FIG. 3B depicts the photoconductive device of FIG. 3A being illuminated.

When no light or electromagnetic radiation illuminates the photoconductive device 300, the electric field E is small due to the relatively large thickness "d" of the nonconductive materials (in this case, the liquid crystal material 303 and the photoconductive window 304) between the electrically-conductive coatings 302, 305. When the photoconductive device 300 is illuminated by light or other electromagnetic radiation 130 that is absorbable by the photoconductive window 304, the electrical conductivity of the photoconductive window 304 increases volumetrically and extends the electrically-conductive region from the rear conductive coating 305 through the photoconductive window 304. As a result, the nonconductive distance "d" between the electrically-conductive coatings 302, 305 is just the thickness of the liquid crystal layer 303, as shown in FIG. 3B, and the electric field between the front and rear conductive surfaces 302, 305 becomes strong enough to permit the liquid crystal material 303 to tune. The liquid crystal 303 only tunes to the wavelength of the light 130 because at that point the liquid crystal layer 303 acts as a filter to block the light or radiation 130 from reaching the photoconductive window 304. As a result, the photoconductive window 304 becomes nonconductive, increasing the thickness "d" of the nonconductive material between the conductive coatings 302, 305 to that shown in FIG. 3A. The increased thickness "d" reduces the electric field E by a factor of approximately 3000× thereby taking the liquid crystal material 303 out of tune. This repeatable phenomenon effectively creates a feedback loop through the photoconductive device 300. The electric field that tunes the liquid crystal material 303 in this example is photoinduced in the sense that the incident light or electromagnetic radiation 130 increases the electrical conductivity of the photoconductive material 304 and thereby controls application of an external electric field that is applied to the liquid crystal 303 by the conductive coating electrodes 302, 305. As the conductivity of the photoconductive material 304 increases, the strength of the electric field applied to the liquid crystal 303 increases thereby tuning the liquid crystal 303 so that it filters the incident electromagnetic radiation or light 130 (while the applied voltage remains constant).

As shown in FIG. 4A, a photovoltaic device 400 comprises a front glass window 401, an electrically-conductive coating 402, a liquid crystal material 403, such as an electrically-tunable cholesteric, nematic, or smectic liquid crystal or other liquid crystal material described in the previous example, a photovoltaic window 404, and a rear glass window 405. The front and rear glass windows 401, 405 may be polarized as described in the previous example. The liquid crystal 403 is sandwiched between the electrically-conductive coating 402 and the photovoltaic windows 404. The front glass window 401 is electrically grounded. The electrically-conductive coating 402 comprises indium-tin oxide, indium oxide, or other optically-transparent material that provides an electrically-conductive surface on the front glass window 401 with good optical transparency. The photovoltaic window 404 comprises, for example, a monocrystalline silicon, polycrystalline silicon, microcrystalline silicon, cadmium telluride, copper indium selenide/sulfide, lithium niobate, lithium niobate doped with metallic impurities, or other material that converts solar and electromagnetic radiation such as visible light, laser light, coherent or incoherent light, ultraviolet light, infrared light, or gamma or x-ray radiation into electricity. Other suitable photoactivated material may be used, as well.

When the photovoltaic device 400 is illuminated by coherent or incoherent light or other electromagnetic radiation 230, as shown in FIG. 4B, the photovoltaic window 404 generates an electric field with the electrically-conductive coating 402 across the liquid crystal 403. The electric field tunes the liquid crystal 403 to filter the wavelength of the electromagnetic radiation or light 230 at which point the liquid crystal 403 blocks the radiation or light 230 from reaching the photovoltaic window 404. When the light or electromagnetic radiation 230 is blocked by the tuned liquid crystal material 403, the photovoltaic window 404 no longer produces a photoinduced electric field and the liquid crystal 403 goes out of tune. This again creates a feedback loop. The photovoltaic device 400 may be configured so the photovoltaic window 404 is optical to the rear of the device 400, if desired.

As disclosed herein, a wide variety of photoconductive, photovoltaic, and other photoactivated materials may be used with cholesteric, nematic, and smectic liquid crystals of positive and negative anisotropy, and other polymer stabilized and polymer dispersed liquid crystal materials to form liquid crystal filters that are autonomously tunable. These self-tuning filters or light valves can be adapted to function with existing state of the art tunable filter systems and can be designed to tune automatically and autonomously to light of different wavelengths. The use of optically-controlled, field-generating substrates and epitaxial materials enables these devices to autonomously and automatically tune liquid crystals and materials with liquid crystal-like birefringent, field dependent absorption/reflection or scatter properties through their self-sensing and self-initiating tuning capability that applies and adjusts electric fields to tune the liquid crystal to filter the light or other radiation that is illuminating the device. The active region of the device is locally defined by the light or radiation source where it illuminates the photoconductive, photovoltaic, or other photoactivated material (i.e., exposed pixels) in the device, as opposed to the entire liquid crystal cell, so the process can be made to operate in the region of a laser beam or other focused or unfocused light or radiation source. In addition, no external AC or DC fields are required except for devices that use photoconductive materials. In the case of devices with photovoltaic materials and other photoactivated materials that generate photoinduced fields, the material generates and applies the tuning electric field to the liquid crystal. Other suitable photoactivated materials include pyroelectric, thermophotovoltaic, piezoelectric materials. The materials may be used as substrates or applied as epitaxial films.

Persons skilled in the art will realize and appreciate that many modifications and variations are possible in light of the above teaching. For example, although the self-tuning windows are illustrated with photoconductive and photovoltaic materials, any other photoactivated or field producing material may be used to tune the liquid crystal material. The disclosed self-tuning windows may be used to tune cholesteric, nematic, smectic, and other liquid crystal materials, or other materials with liquid crystal-like, birefringent, or field dependent absorption/reflection properties to act as filters or light valves.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An apparatus, comprising:
    a substrate having permittivity and absorption characteristics supporting plasmon excitation within a spectral region of interest;
    a plasmonic layer, disposed upon the substrate and including plasmonic material configured to exhibit surface plasmon polaritons (SPP) when exposed to an incident light beam of a first polarization; and
    a liquid crystal (LC) layer, disposed upon at least a portion of the plasmonic layer and configured to change a polarization of a light beam passing therethrough;
    said LC layer, in response to a first electric field applied thereto, changes said polarization of said light beam passing therethrough to said first polarization;
    said LC layer, in response to a second electric field applied thereto, changes said polarization of said light beam passing therethrough to a second polarization, said second polarization being substantially orthogonal to said first polarization, wherein the plasmonic material comprises at least one layer of graphene ribbons having a geometry and spacing selected to provide sensitivity to the spectral region of interest, wherein said first polarization is perpendicular to a long axis of said graphene ribbons.

2. The apparatus of claim 1, wherein said plasmonic material is configured to not exhibit SPP when exposed to an incident light beam of said second polarization.

3. The apparatus of claim 1, wherein the plasmonic material is formed within said plasmonic layer as one or more of a ribbon form, a monolayer form, a particle/colloid form and a nanoparticle/nanocolloid form.

4. The apparatus of claim 3, wherein each monolayer of plasmonic material comprises at least one of graphene, gold, silver, copper, $VO_2$, and $V_xO_y$.

5. The apparatus of claim 3, wherein said plasmonic layer comprises an elastomeric plasmonic layer configured to expand or contract in response to an applied stimuli to change a geometry of plasmonic material formed therein.

6. The apparatus of claim 3, wherein said plasmonic layer comprises a deformable plasmonic layer and said LC layer comprises an elastomeric LC elastomer layer mechanically cooperating with said deformable plasmonic layer and configured to expand or contract in response to an applied stimuli to thereby change a geometry of plasmonic material within said deformable plasmonic layer.

7. The apparatus of claim 3, wherein the plasmonic layer comprises a stack of plasmonic material ribbon layers separated by at least one of tunable dielectric layers, metallic layers and phase change layers.

8. The apparatus of claim 1, wherein:
    said plasmonic material further comprises anisometric shaped plasmonic material; and
    said LC layer, in response to each of at least one additional electric field applied thereto, changes said polarization of said light beam passing therethrough to, respectively, at least one additional polarization.

9. The apparatus of claim 1, wherein said apparatus further comprises a controllable electric potential source configured to impart each of a plurality of electric fields to said LC layer to provide thereby a tuning function of said apparatus.

10. The apparatus of claim 1, wherein the substrate comprises at least one of silicon, $SiO_2$, $Al_2O_3$, $VO_2$, $V_xO_y$, CdTe, and ITO.

11. The apparatus of claim 1, wherein the liquid crystal layer comprises at least one of cholesteric liquid crystals (CLC), nematic liquid crystals), twisted nematic liquid crystals, smectic liquid crystal, and swinging nematic liquid crystals (SLC).

12. The apparatus of claim 1, wherein said incident light comprises one of an optical wavelength light and a millimeter wavelength light.

13. The apparatus of claim 1, wherein said plasmonic layer comprises a deformable plasmonic layer configured to expand or contract in response to an applied stimuli such that a distance between said graphene ribbons changes in response to said expanding or contracting.

14. The apparatus of claim 1, wherein the plasmonic material comprises a metallic layer having disposed thereon a distributed Bragg mirror configured to excite Tamm plasmons therebetween when exposed to an incident light beam.

15. The apparatus of claim 14, wherein the distributed Bragg mirror comprises a stack of dielectric layers wherein the thicknesses of each layer multiplied by the refractive index of the respective layer is equal to one fourth of the wavelength of the incident light beam.

16. The apparatus of claim 15, wherein the distributed Bragg mirror further comprises a metallic layer disposed within the stack of dielectric layers.

17. A method, comprising:
disposing, upon a substrate having permittivity and absorption characteristics supporting plasmon excitation within spectral region of interest, a plasmonic layer including plasmonic material configured to exhibit surface plasmon polaritons (SPP) when exposed to an incident light beam of a first polarization; and
disposing, upon at least a portion of the plasmonic layer, a liquid crystal (LC) layer configured to change a polarization of a light beam passing therethrough;
the LC layer, in response to a first electric field applied thereto, changes the polarization of the light beam passing therethrough to the first polarization;
the LC layer, in response to a second electric field applied thereto, changes the polarization of the light beam passing therethrough to a second polarization, the second polarization being substantially orthogonal to the first polarization, wherein the plasmonic material comprises at least one layer of graphene ribbons having a geometry and spacing selected to provide sensitivity to the spectral region of interest wherein said first polarization is perpendicular to a long axis of said graphene ribbons.

* * * * *